US012699224B2

(12) United States Patent (10) Patent No.: US 12,699,224 B2
Etheridge et al. (45) Date of Patent: Aug. 4, 2026

(54) WINDOW CUTTING TOOL FOR MULTI-FIBER CABLE

(71) Applicant: PPC BROADBAND FIBER LTD., Framlingham (GB)

(72) Inventors: Harvey Etheridge, Norfolk (GB); Shaun Trezise, Aldeburgh (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 948 days.

(21) Appl. No.: 17/711,019

(22) Filed: Mar. 31, 2022

(65) Prior Publication Data

US 2022/0317374 A1 Oct. 6, 2022

Related U.S. Application Data

(60) Provisional application No. 63/169,195, filed on Mar. 31, 2021.

(51) Int. Cl.
*G02B 6/25* (2006.01)
*G02B 6/46* (2006.01)
*H02G 1/12* (2006.01)

(52) U.S. Cl.
CPC ............... *G02B 6/25* (2013.01); *G02B 6/566* (2023.05); *H02G 1/1217* (2013.01)

(58) Field of Classification Search
CPC .. H02G 1/1217; H02G 1/1236; H02G 1/1297; H02G 1/126; H02G 1/1263;
(Continued)

(56) References Cited

U.S. PATENT DOCUMENTS 2,120,398 A * 6/1938 Edwards .............. H02G 1/1229
30/91.2
2,141,002 A * 12/1938 Huff ..................... H02G 1/1231
30/91.2
(Continued)

FOREIGN PATENT DOCUMENTS

CN 111478236 A * 7/2020 ............. H01R 43/28
DE 202014101596 U1 * 6/2014 .......... H02G 1/1224
(Continued)

OTHER PUBLICATIONS

DE-202014101596-U1 english translation; Jun. 5, 2014; Kochling, Conrad.*

(Continued)

*Primary Examiner* — Laura M Lee
(74) *Attorney, Agent, or Firm* — MH2 TECHNOLOGY LAW GROUP LLP

(57) ABSTRACT

A window cutting tool includes a first body, a second body configured to be pivotally coupled with the first body between an open configuration and a closed configuration, and a blade carriage configured to carry a blade and to be slidingly coupled with at least one of the first body and the second body. At least one of the first body and the second body is configured to guide sliding movement of the blade carriage relative to the first body and the second body in a longitudinal direction. The first body and the second body are configured to expose a portion of a multi-fiber cable to the blade carriage when the first body and the second body are in the closed configuration. The blade is configured to cut through a jacket of the multi-fiber cable without damaging an individual fiber within the multi-fiber cable to form a window that is configured to allow a technician to access the individual fiber within the multi-fiber cable.

20 Claims, 8 Drawing Sheets

(58) Field of Classification Search
CPC .... H02G 1/1229; H02G 1/1209; G02B 6/245;
G02B 6/566; G02B 6/25
USPC ........................... 83/614; 30/90.1, 90.4, 91.1
See application file for complete search history.

(56) References Cited

U.S. PATENT DOCUMENTS

| | | | | |
|---|---|---|---|---|
| 3,535,785 | A * | 10/1970 | Matthews | H02G 1/1229 |
| | | | | 30/91.2 |
| 4,434,554 | A | 3/1984 | Korbelak | |
| 4,947,549 | A * | 8/1990 | Genovese | G02B 6/566 |
| | | | | 81/9.4 |
| 5,093,992 | A * | 3/1992 | Temple, Jr. | G02B 6/4497 |
| | | | | 30/90.4 |
| 5,257,459 | A * | 11/1993 | Goodson | B26B 3/00 |
| | | | | 30/313 |
| 5,822,863 | A * | 10/1998 | Ott | G02B 6/566 |
| | | | | 30/90.9 |
| 6,067,715 | A * | 5/2000 | Hollingsworth | H02G 1/1236 |
| | | | | 81/9.44 |
| 6,381,850 | B1 * | 5/2002 | Warner | H02G 1/1229 |
| | | | | 30/90.6 |
| 7,620,286 | B2 * | 11/2009 | Lu | G02B 6/566 |
| | | | | 385/136 |
| 8,245,405 | B2 * | 8/2012 | Lu | H02G 1/1217 |
| | | | | 30/91.2 |
| 10,459,185 | B2 * | 10/2019 | Eisele | G02B 6/4497 |
| 11,349,285 | B2 * | 5/2022 | Butler | H02G 1/1217 |
| 2002/0114609 | A1 * | 8/2002 | Thebault | G02B 6/245 |
| | | | | 83/23 |
| 2010/0319199 | A1 * | 12/2010 | Mullaney | H02G 1/1217 |
| | | | | 30/357 |
| 2011/0010944 | A1 * | 1/2011 | Le Dissez | G02B 6/566 |
| | | | | 30/90.4 |
| 2022/0317374 | A1 * | 10/2022 | Etheridge | G02B 6/566 |
| 2024/0069283 | A1 * | 2/2024 | Eriksen | G02B 6/566 |

FOREIGN PATENT DOCUMENTS

| | | | | |
|---|---|---|---|---|
| DE | 102016101940 | A1 * | 1/2017 | .......... H02G 1/1212 |
| DE | 202017107094 | U1 * | 2/2018 | ............ B25G 1/085 |
| EP | 0822427 | A1 | 2/1998 | |
| EP | 4304027 | A1 * | 1/2024 | .......... H02G 1/1219 |
| KR | 20160013729 | A * | 2/2016 | .......... H02G 1/1212 |
| WO | WO-9953583 | A1 * | 10/1999 | .......... H02G 1/1217 |

OTHER PUBLICATIONS

Search Report dated Jun. 30, 2022 in corresponding International Application No. PCT/US2022/022968, 6 pages.
Written Opinion dated Jun. 30, 2022 in corresponding International Application No. PCT/US2022/022968, 5 pages.

* cited by examiner

WINDOW CUTTING TOOL FOR MULTI-FIBER CABLE

CROSS-REFERENCE TO RELATED APPLICATION

This application claims the benefit of U.S. Provisional Application No. 63/169,195, filed on Mar. 31, 2021. The disclosure of the prior application is hereby incorporated by reference herein in its entirety.

TECHNICAL FIELD

The present disclosure relates generally to window cutting tool for fiber optic cable. More particularly, the present disclosure is directed to a tool configured to cut a window through a jacket of a multi-fiber cable so that the individual fibers within the cable can be accessed via the window.

BACKGROUND

Conventional window cutting tools for fiber optic cable are designed to precisely cut a window in a multi-fiber cable. The window allows the individual fibers in the multi-fiber cable to be accessed, cut, and retracted from the cable. Such conventional tools typically grip and hold the cable in an arc profile so that a cut can be made with a cutting blade without damaging the individual fibers.

Unfortunately, such conventional window cutting tools for fiber optic cable are designed to work with only one size of cable and cannot be adjusted for different cut depths. Thus, a technician needs to have a separate window cutting tool for each size cable that the technician works with. Further, such conventional window cutting tools are often inconsistent between cuts, for example, some cuts are too deep, which can damage the fibers within the cable, and some cuts are too shallow, which causes the technician to have to perform multiple cuts.

Therefore, it may be desirable to provide a window cutting tool that consistently and reliably cuts a window in a jacket of a multi-fiber cable. Also, it may be desirable to provide a window cutting tool that is capable of cutting a window into various sizes of multi-fiber cable. It may also be desirable to provide a window cutting tool that can be adjusted to cut at different depths to cut a window in a jacket of a multi-fiber cable.

SUMMARY

According to various aspects of the disclosure, a window cutting tool includes a window cutting tool configured to cut a window through a jacket of a multi-fiber cable so that individual fibers within the cable can be accessed via the window, including a first body configured to extend in a longitudinal direction, a second body configured to extend in the longitudinal direction and be coupled with the first body, and a blade carriage configured to be slidingly coupled with the first body and the second body. The first body and the second body are configured to pivot relative to one another about a hinge between an open configuration and a closed configuration, an inner wall of the first body and an inner wall of the second body are configured to move toward and away from one another as the first body and the second body are pivotally moved relative to one another between the open configuration and the closed configuration, and the inner wall of the first body defines a first portion of a curved groove that extends from a first end of the tool to a second end of the tool in the longitudinal direction, and the inner wall of the second body defines a second portion of the curved groove. An outer wall of the first body and an outer wall of the second body each include a linear groove configured to guide sliding movement of the blade carriage relative to the first body and the second body in the longitudinal direction, and the inner wall of the first body and the inner wall of the second body each include alignment structures configured to move a multi-fiber cable that extends in a longitudinal direction between the inner wall of the first body and the inner wall of the second body into the curved groove when the first body and the second body are pivotally moved relative to one another from the open configuration to the closed configuration. The curved groove is configured to expose a curved portion of the multi-fiber cable to an exterior of the first body and the second body when the first body and the second body are in the closed configuration, and the blade carriage is configured to carry a blade at an acute angle relative to the exposed curved portion of the multi-fiber cable such that the blade is configured to cut a window through a jacket of the exposed curved portion of the multi-fiber cable as the blade carriage is slidingly moved relative to the first body and the second body in the longitudinal direction. The window cutting tool is configured to consistently and reliably cut through the jacket of the multi-fiber cable at a desired depth to form a desired sized window without damaging individual fibers within the multi-fiber cable and that allows a technician to access the individual fibers within the multi-fiber cable.

In some aspects, the alignment structures include projections extending from the inner wall of the first body and the inner wall of the second body.

In various aspects, the blade carriage includes a blade carrying portion configured to carry the blade and extension arms configured to extend from the blade carrying portion, and the extension arms are configured to straddle the first body and the second body in the closed configuration. In some embodiments, the extension arms include guide portions configured to be received in the linear grooves and to guide sliding movement of the blade carriage relative to the first body and the second body in the longitudinal direction.

According to various aspects of the disclosure, a window cutting tool configured to cut a window through a jacket of a multi-fiber cable includes a first body, a second body configured to be pivotally coupled with the first body between an open configuration and a closed configuration, and a blade carriage configured to be slidingly coupled with the first body and the second body. An inner wall of the first body and an inner wall of the second body are configured to move toward and away from one another as the first body and the second body are pivotally moved relative to one another between the open configuration and the closed configuration. The inner wall of the first body and the inner wall of the second body cooperate to define a curved groove extending from a first end of the tool to a second end of the tool in a longitudinal direction, at least one of an outer wall of the first body and an outer wall of the second body includes a guide feature configured to guide sliding movement of the blade carriage relative to the first body and the second body in the longitudinal direction, and at least one of the inner wall of the first body and the inner wall of the second body includes an alignment feature configured to move a multi-fiber cable that extends in a longitudinal direction between the inner wall of the first body and the inner wall of the second body into the curved groove when the first body and the second body are pivotally moved relative to one another from the open configuration to the closed configuration. The curved groove is configured to expose a curved portion of the multi-fiber cable to an exterior of the first body and the second body when the first body and the second body are in the closed configuration, and the blade carriage is configured to carry a blade at an acute angle relative to the exposed curved portion of the multi-fiber cable such that the blade is configured to cut a window through a jacket of the exposed curved portion of the multi-fiber cable as the blade carriage is slidingly moved relative to the first body and the second body in the longitudinal direction. The window cutting tool is configured to consistently and reliably cut through the jacket of the multi-fiber cable at a desired depth to form a desired sized window without damaging an individual fiber within the multi-fiber cable and that allows a technician to access the individual fiber within the multi-fiber cable.

In some aspects, the alignment feature includes a projection extending from the at least one of the inner wall of the first body and the inner wall of the second body.

In various aspects, the blade carriage includes a blade carrying portion configured to carry the blade and extension arms configured to extend from the blade carrying portion, and the extension arms are configured to straddle the first body and the second body in the closed configuration.

According to some aspects, at least one of the extension arms includes a guide portion configured to be received in the guide feature and to guide sliding movement of the blade carriage relative to the first body and the second body in the longitudinal direction.

According to various aspects, the first body and the second body are configured to pivot relative to one another about a hinge between the open configuration and the closed configuration.

In some aspects, the inner wall of the first body defines a first portion of the curved groove and the inner wall of the second body defines a second portion of the curved groove.

In various aspects, the outer wall of the first body and the outer wall of the second body each include the guide feature configured to guide sliding movement of the blade carriage relative to the first body and the second body in the longitudinal direction.

According to some aspects, the inner wall of the first body and the inner wall of the second body include the alignment structure configured to move the multi-fiber cable into the curved groove when the first body and the second body are pivotally moved relative to one another from the open configuration to the closed configuration.

According to various aspects of the disclosure, a window cutting tool includes a first body, a second body configured to be pivotally coupled with the first body between an open configuration and a closed configuration, and a blade carriage configured to carry a blade and to be slidingly coupled with at least one of the first body and the second body. At least one of the first body and the second body is configured to guide sliding movement of the blade carriage relative to the first body and the second body in a longitudinal direction, and the first body and the second body are configured to expose a portion of a multi-fiber cable to the blade carriage when the first body and the second body are in the closed configuration. The blade is configured to cut through a jacket of the multi-fiber cable without damaging an individual fiber within the multi-fiber cable so as to form a window that is configured to allow a technician to access the individual fiber within the multi-fiber cable.

In some aspects, the first body and the second body are configured to define a curved groove configured to extend from a first end of the tool to a second end of the tool in a longitudinal direction and to expose a curved portion of a multi-fiber cable, at least one of the first body and the second body includes an alignment feature configured to move the multi-fiber cable into the curved groove when the first body and the second body are pivotally moved relative to one another from the open configuration to the closed configuration, and the alignment feature includes a projection extending from the at least one of an inner wall of the first body and an inner wall of the second body. In some embodiments, an inner wall of the first body defines a first portion of the curved groove and an inner wall of the second body defines a second portion of the curved groove. In some embodiments, an inner wall of the first body and an inner wall of the second body each include the alignment feature configured to move the multi-fiber cable into the curved groove when the first body and the second body are pivotally moved relative to one another from the open configuration to the closed configuration.

According to various aspects, the blade carriage includes a blade carrying portion configured to carry the blade and extension arms configured to extend from the blade carrying portion, and the extension arms are configured to straddle the first body and the second body in the closed configuration. In some embodiments, at least one of the extension arms includes a guide portion configured to be received in a guide feature of at least one of the first body and the second body and to guide sliding movement of the blade carriage relative to the first body and the second body in the longitudinal direction. In some embodiments, an outer wall of the first body and an outer wall of the second body each include the guide feature configured to guide sliding movement of the blade carriage relative to the first body and the second body in the longitudinal direction.

According to some aspects, the first body and the second body are configured to pivot relative to one another about a hinge between the open configuration and the closed configuration.

The foregoing and other features of construction and operation of the invention will be more readily understood and fully appreciated from the following detailed disclosure, taken in conjunction with accompanying drawings. Throughout the description, like reference numerals will refer to like parts in the various embodiments and drawing figures.

DETAILED DESCRIPTION OF EMBODIMENTS

As a preface to the detailed description, it should be noted that, as used in this specification and the appended claims, the singular forms "a," "an," and "the" include plural referents, unless the context clearly dictates otherwise.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 1:
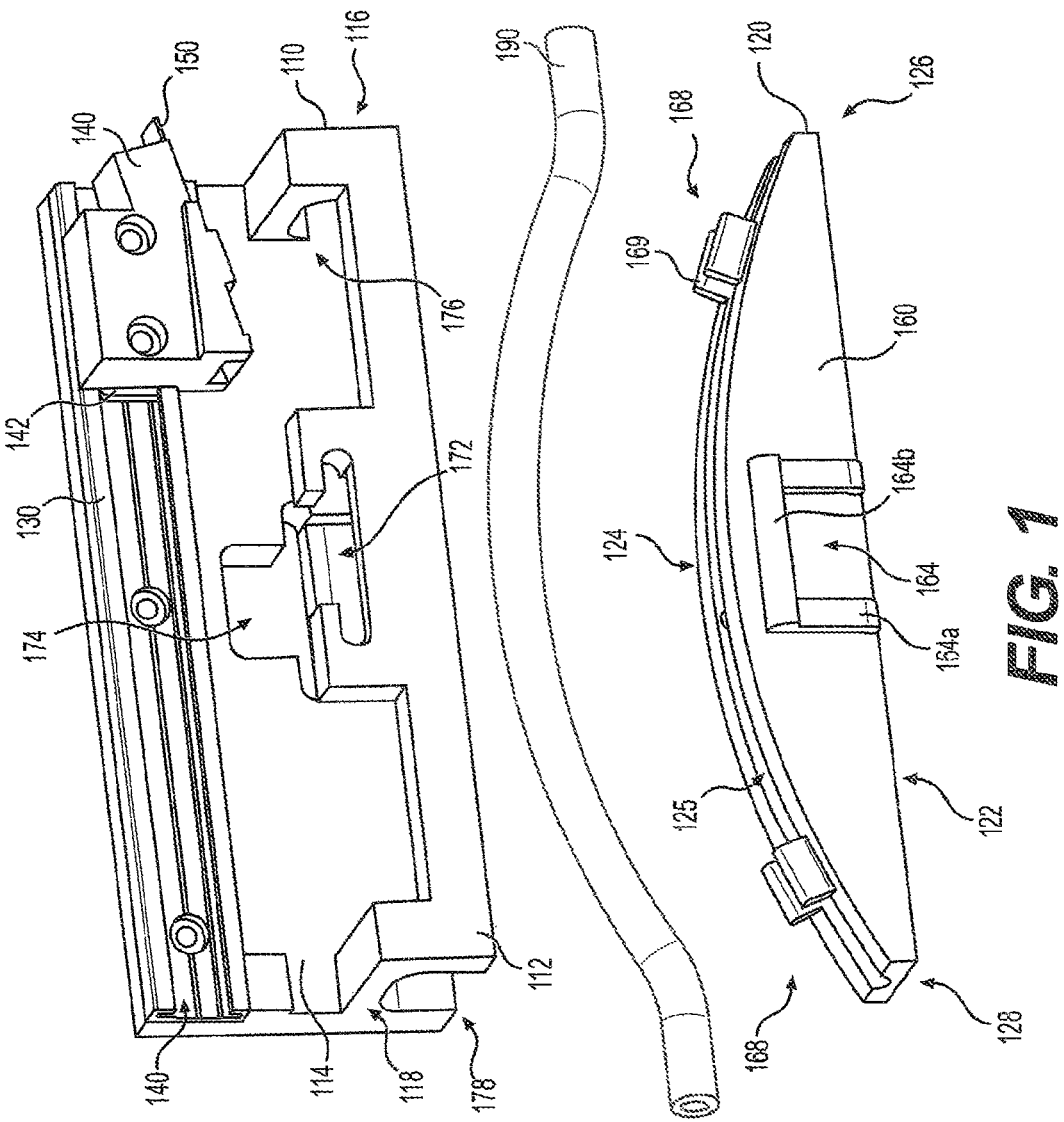
FIG. 1 is an exploded perspective view of an exemplary window cutting tool in accordance with various aspects of the disclosure.
Figure 1:
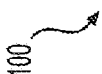
Figures 2, 3:
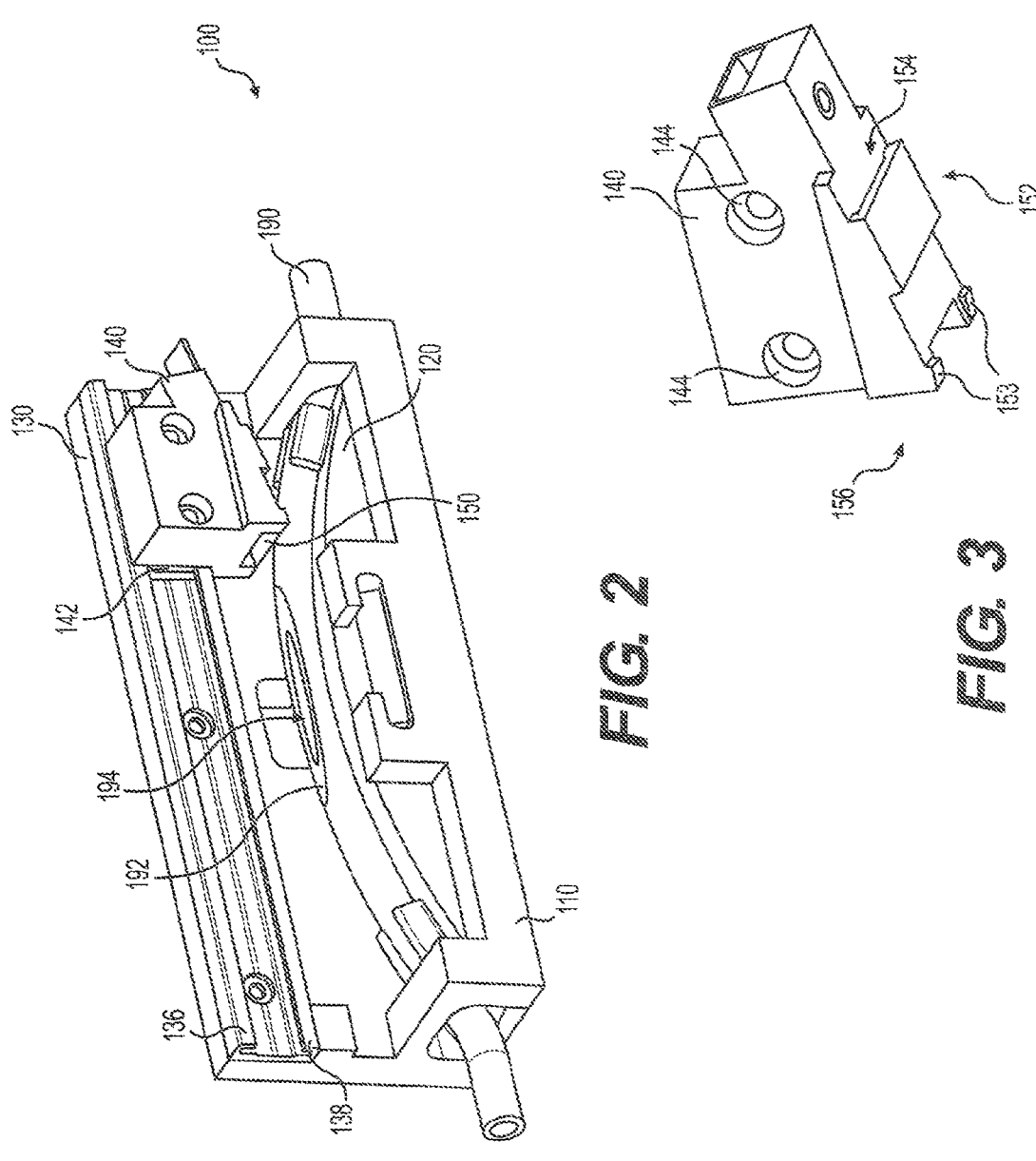
FIG. 2 is a perspective view of the exemplary window cutting tool of FIG. 1 with a length of multi-fiber cable.
FIG. 3 is a perspective view of an exemplary blade carriage of the exemplary window cutting tool of FIG. 1.

FIGS. 1-6 illustrate an exemplary window cutting tool 100 in accordance with various aspects of the disclosure. As shown in FIG. 1, the window cutting tool 100 includes a body 110, a base or shoe member 120, a rail 130, a blade carriage 140, and a blade 150. As described below, the base 120 is configured to be removably coupled with the body 110. The rail 130 may be coupled with the body 110, or the rail 130 and the body 110 may be a single piece of unitary construction. The blade carriage 140 is configured to carry the blade 150, which can be removed when the blade becomes dull. The blade carriage 140 is configured to be slidingly coupled with the rail 130 so that the blade 150 can cut a window in a jacket of a cable.

Figures 4, 5, 6:
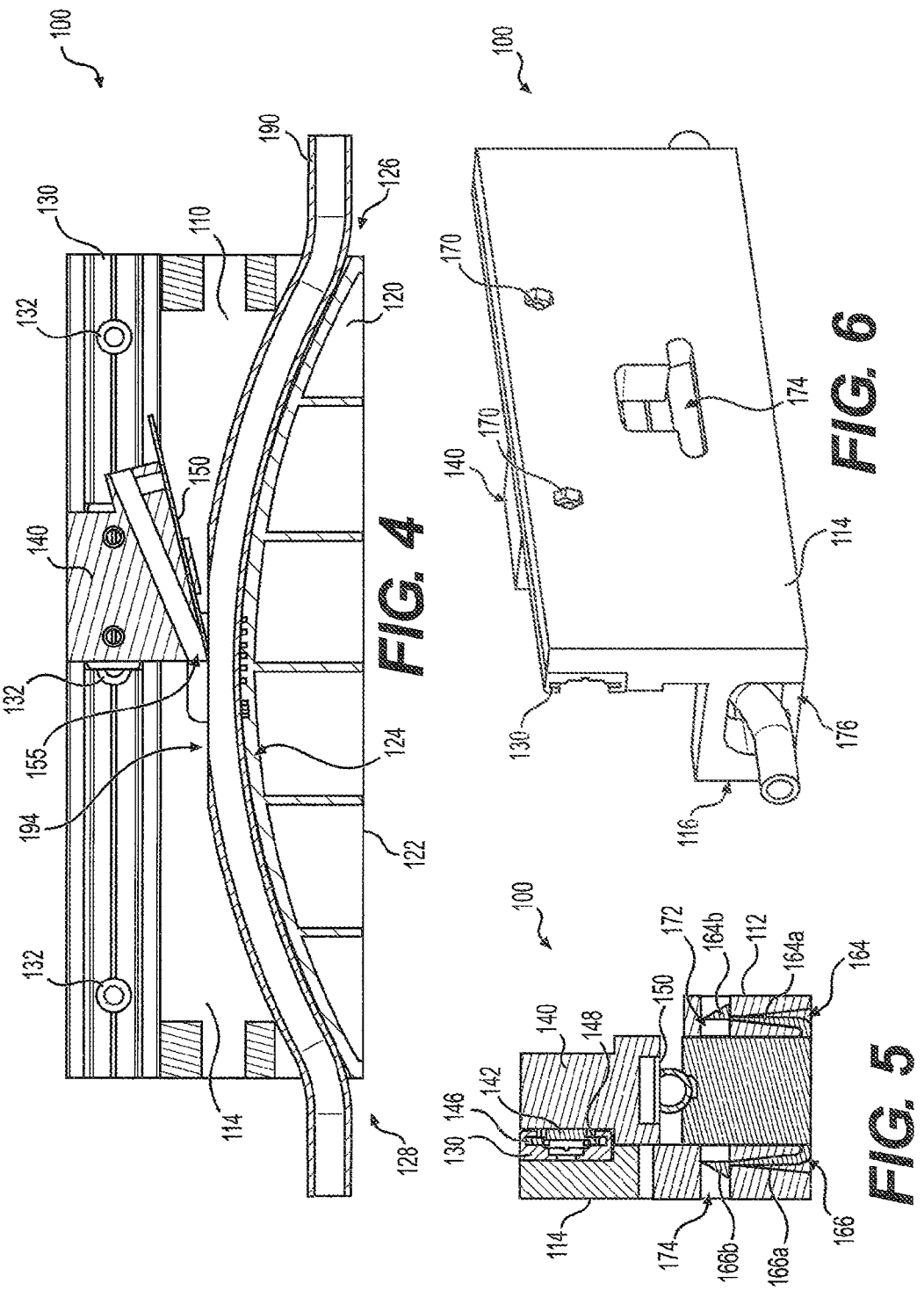
FIG. 4 is a side cross-sectional view of the exemplary window cutting tool of FIG. 1 with a length of multi-fiber cable.
FIG. 5 is an end view of the exemplary window cutting tool of FIG. 1 with a length of multi-fiber cable.
FIG. 6 is a rear perspective view of the exemplary window cutting tool of FIG. 1 with a length of multi-fiber cable.

As best shown in FIGS. 1 and 5, the base 120 includes a flat bottom 122 and a curved top 124 that extend from a first end 126 to a second end 128 of the base 120. The top 124 includes a groove 125 along its length that is configured to receive a cable 190, for example, a multi-fiber cable. The base 120 includes side walls 160, 162 that extend from the first end 126 to the second end 128. The side walls 160, 162 include respective engagement features 164, 166 such as, for example, flexible fingers 164*a*, 166*a* that include projections 164*b*, 166*b* that extend outward from the side walls 160, 162 in opposite directions. The top 124 of the base 120 may include one or more holders 168 configured to receive and hold the cable 190 during a cutting procedure. For example, each of the holders 168 may comprise a pair of flexible fingers 169 extending from the top 124 on opposite sides of the groove 125. The base 120 can be removed from the body 110 and replaced with a different sized base in order to accommodate and cut cables of different sizes.

The body 110 includes a front wall 112, a back wall 114, a first end wall 116, and a second end wall 118. The first and second end walls 116, 118 extend between the front wall 112 and the back wall 114. The front wall 112 and the back wall 114 include respective notches or openings 172, 174 structured and arranged to receive the engagement features 164, 166 to couple the base 120 with the body 110. The first and second end walls 116, 118 include respective openings 176, 178 configured to permit the cable 190 to pass through.

The body 110 may include one or more openings 170 extending through the back wall 114 that are configured to receive a fastener member (not shown) that can couple the rail 130 with the body 110 in an embodiment where the body and the rail are separate structures that are configured to be removably coupled together. For example, the fastener members may extend through the back wall 114 and be threadedly coupled with the rail 130. Additionally or alternatively, the rail 130 may including one or more openings 132 extending therethrough that are configured to receive a fastener member (not shown) that can couple the rail 130 with the body 110 in an embodiment where the body and the rail are separate structures that are configured to be removably coupled together. For example, the fastener members may extend through the rail 130 and be threadedly coupled with the back wall 114.

The rail 130 defines a track 134 extending in a longitudinal direction and having upper and lower slots 136, 138 configured to receive a extension arm 142 of the blade carriage 140. The extension arm 142 and the blade carriage 140 may be separate structures that are configured to be coupled to one another, or the extension arm 142 and the blade carriage 140 may be a single piece of unitary construction. The extension arm 142 includes upper and lower flanges 146, 148 that are configured to be received by the upper and lower slots 136, 138 of the track 134. When the upper and lower flanges 146, 148 are received by the upper and lower slots 136, 138, the extension arm 142 and the blade carriage 140 are slidable along the track 134 in the longitudinal direction but are prevented from being removed from the track 134 in a direction transverse to the longitudinal direction.

The blade carriage 140 may include openings 144 configured to receive fastener members (not shown) to couple the blade carriage 140 to the extension arm 142 when the extension arm 142 and the blade carriage 140 are separate structures that are configured to be coupled to one another. The blade carriage 140 may include a bottom 152 that defines a slot 154 configured to receive the blade 150 therethrough. In some embodiments, the blade 150 may be a chisel-type blade, for example. The blade 150 may be secured to the blade carriage 140 via faster member (not shown) that can, for example, extend through the blade 150 and be threadedly coupled with the blade carriage 140. Of course, it should be appreciated that the blade 150 may be coupled with the blade carriage 140 by any conventional means. The blade carriage 140 may include a channel 155 that extends from a front 156 of the blade carriage 140 to a rear 158 of the blade carriage 140 such that a cut portion of the cable 190 can move through the channel 155 without getting stuck in the tool 100 as the blade 150 cuts the cable 190. The bottom 152 may include one or more engagement features 153 near the front 156 that may help to position the blade 150 relative to the blade carriage 140.

As best illustrated in FIG. 4, when the blade carriage 140 and the extension arm 142 are positioned in the upper and lower slots 136, 138 of the track 134, the blade 150 is held at an acute angle relative to a plane that extends in the longitudinal direction parallel to the bottom 126 of the base 120. The acute angle of the blade 150 relative to the curvature of the cable 190 created by the top 124 of the base 120 facilitates cutting of a portion of a jacket 192 of the cable 190 to form a window 194 into the cable 190 so that individual fibers (not shown) in the cable 190 can be accessed. As the blade carriage 140 is slidingly moved along the track 134 in a direction from the first end wall 116 toward the second end wall 118, the blade 150 is configured to cut the portion of the jacket 192 of the cable 190 to form the window 194.

Figures 9, 10:
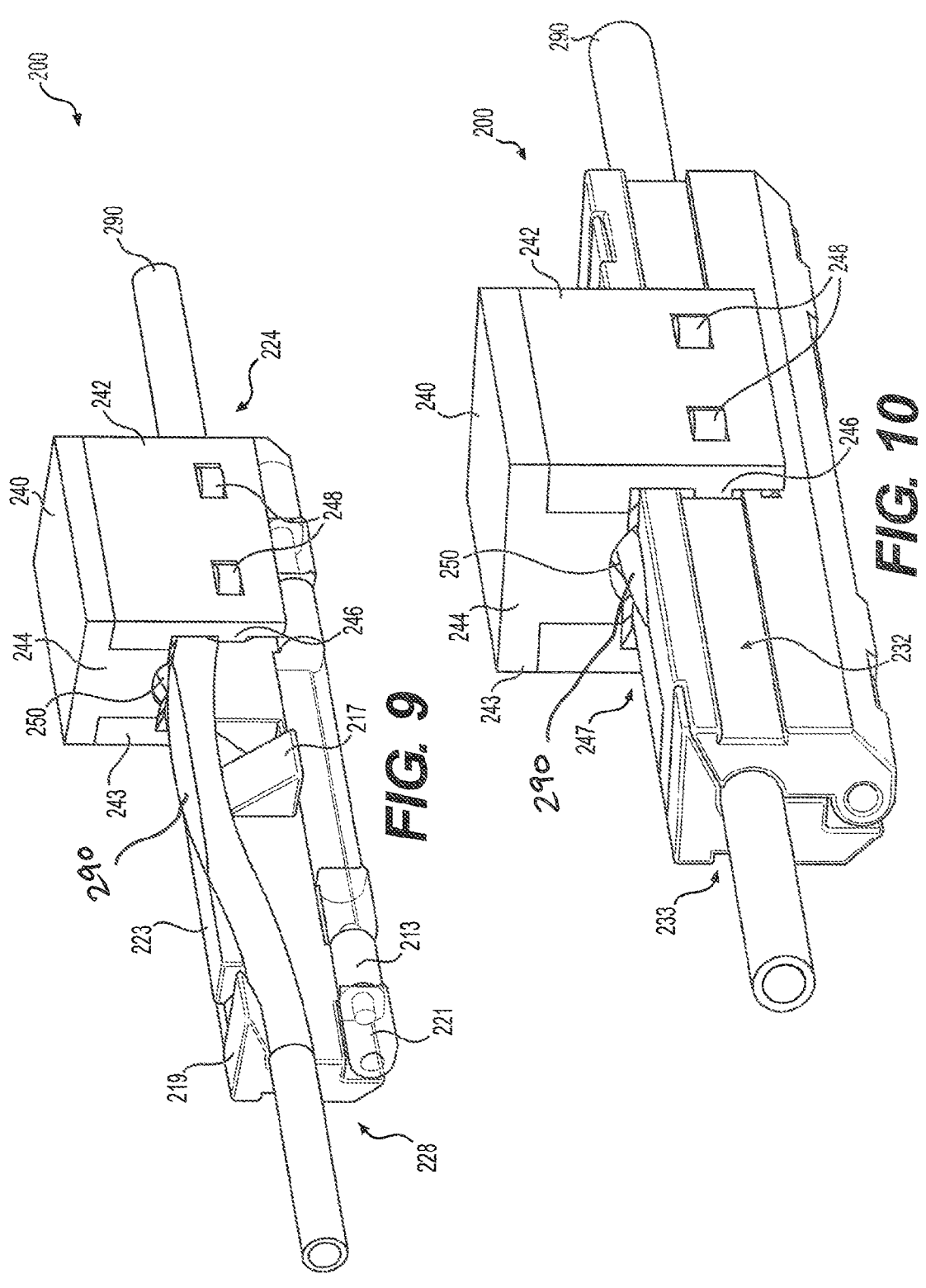
FIG. 9 is a partial cutaway view of another embodiment an exemplary window cutting tool including the bodies of FIG. 7 with a length of multi-fiber cable.
FIG. 10 is a perspective view of the exemplary window cutting tool of FIG. 9 with a length of multi-fiber cable.
Figure 11:
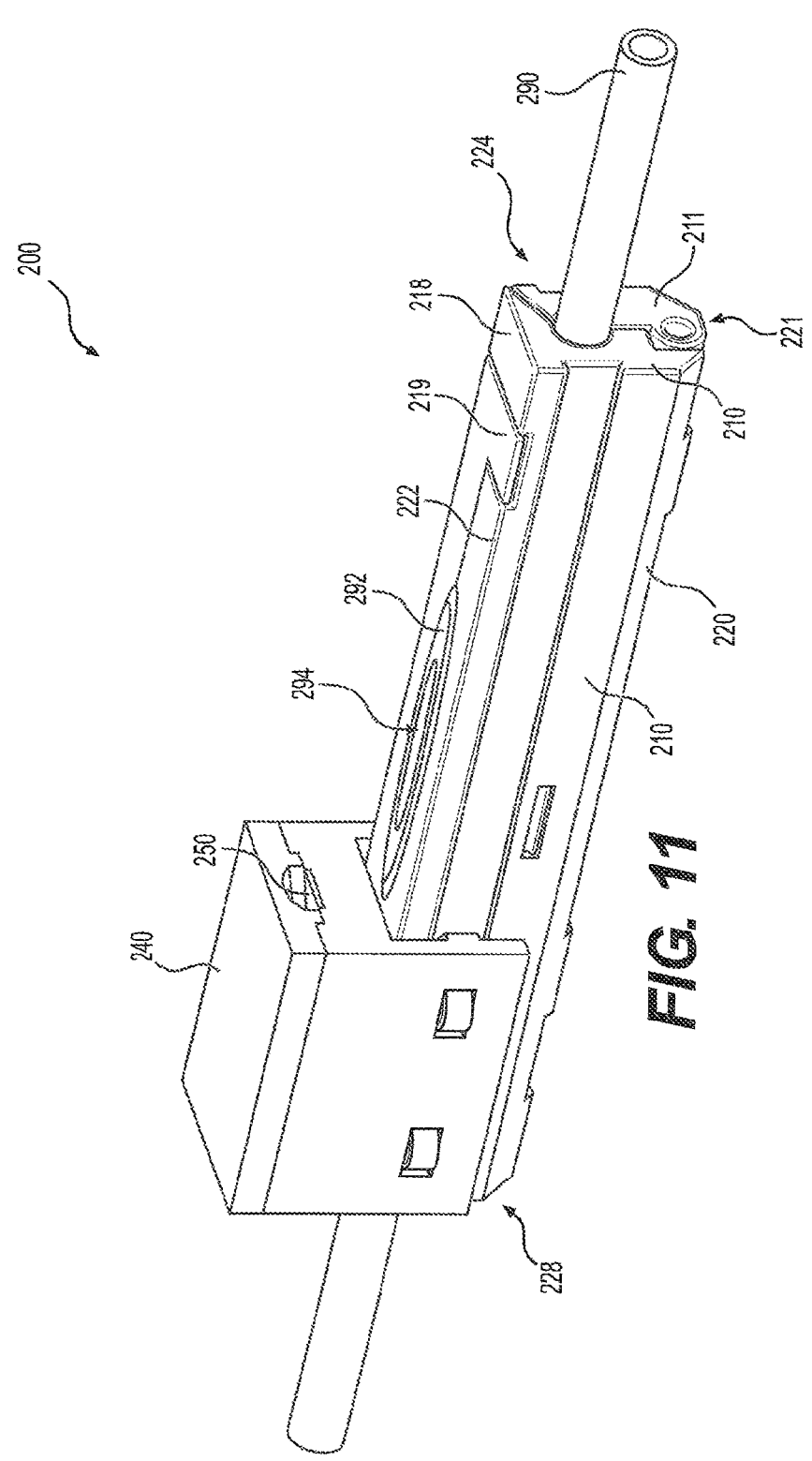
FIG. 11 is another perspective view of the exemplary window cutting tool of FIG. 9 with a length of multi-fiber cable.

FIGS. 7-11 illustrate another exemplary window cutting tool 200 in accordance with various aspects of the disclosure. The window cutting tool 200 includes a first body 210, a second body 211, a blade carriage 240, and a blade 250. The first and second bodies 210, 211 extend in a longitudinal direction from a first end 224 to a second end 228 of the window cutting tool 200. Each of the first and second bodies 210, 211 has a respective first edge 220, 221 that extends from the first end 224 to the second end 228. The respective first edges 220, 221 are pivotally coupled to one another via one or more hinges 213 such that the first and second bodies 210, 211 are movable between an open configuration (FIG. 7) and a closed configuration (FIG. 10). The first and second bodies 210, 211 include respective second edges 222, 223 that extend from the first end 224 to the second end 228 and are opposite to the respective first edges 220, 221. The second edges 222, 223 are configured to move toward and away from one another as the first and second bodies 210, 211 are pivoted relative to one another about the one or more hinges 213 between the open configuration and the closed configuration. As illustrated, the first and second bodies 210, 211 may be identical to one another and rotated by 180° relative to one another to be connected by the one or more hinges 213.

The first and second bodies 210, 211 each include a respective inner wall 226, 227 that extends from the first end 224 to the second end 228 between the respective first edges 220, 221 and second edges 222, 223. The inner walls 226, 227 move toward and away from one another as the first and second bodies 210, 211 are pivoted relative to one another about the one or more hinges 213 between the open configuration and the closed configuration. Each of the inner walls 226, 227 includes a respective portion 225a, 225b of a curved groove 225 that extends from the first end 224 to the second end 228 and is configured to receive a cable 290, for example, a multi-fiber cable 290. The portions 225a, 225b form the curved groove 225 when the inner walls 226, 227 are in the closed position. The curved groove 225 is configured to completely surround the cable 290 from the first end 224 to the second end 228 in the closed position, except for an opening 229 in the second edges 222, 223 that is sized to permit a portion of the cable 290 to extend through the opening 229.

Figures 7, 8:
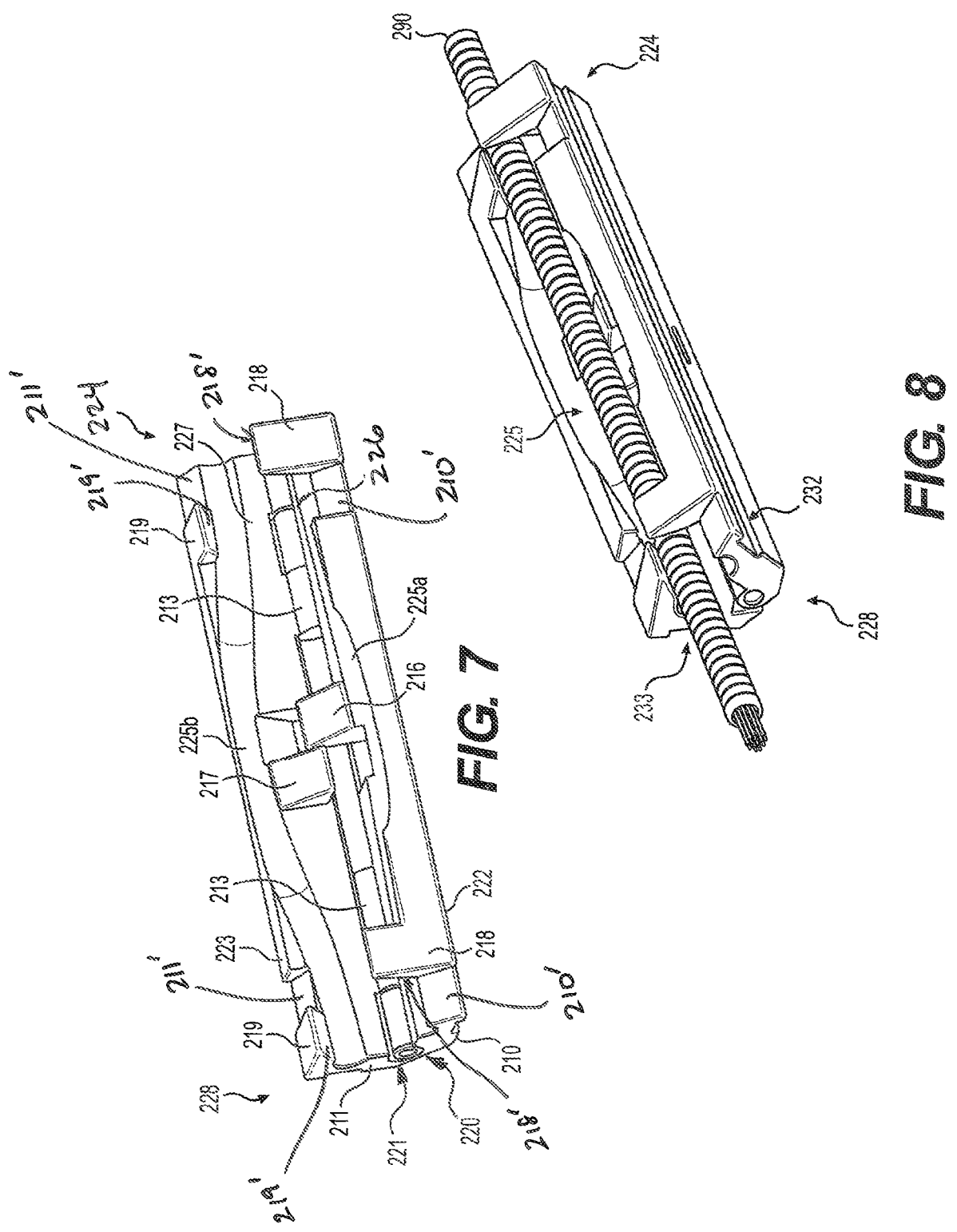
FIG. 7 is a perspective view of bodies of another embodiment an exemplary window cutting tool in accordance with various aspects of the disclosure.
FIG. 8 is a perspective view of the bodies of FIG. 7 with a length of multi-fiber cable.

As shown in FIG. 7, a ramped projection 216 extends from the inner wall 226 toward the inner wall 227, and a ramped projection 217 extends from the inner wall 227 toward the inner wall 226. As illustrated, the ramped projections 216, 217 may be disposed at a middle portion of the first and second bodies 210, 211. The ramped projections 216, 217 are between the first edges 220, 221 and the groove portions 225a, 225b and are closer to the first edges 220, 221 than the second edges 222, 223. The ramped projections 216, 217 include respective ramped surfaces 216', 217' facing in a direction toward the second edges 222, 223. The ramped projections 216, 217 are configured such that when a cable 290 is placed between the inner walls 226, 227 of the body 210, 211 in the open configuration, the cable can rest on the ramped surfaces 216', 217'. When the bodies 210, 211 are pivoted relative to one another about the one or more hinges 213 from the open configuration to the closed configuration, the ramped surfaces 216', 217' are configured to move the cable 290 toward the groove portions 225a, 225b. When the first and second bodies 210, 211 are in the closed configuration, the cable 290 is in the groove 225.

The cutting tool 200 may include ramped projections 218 extending from the second edge 222 of the body 210 and ramped projections 219 extending from the second edge 223 of the body 211. As illustrated, a pair of ramped projections 218 may be disposed at a opposite ends of the first and second bodies 210, 211, and a pair of ramped projections 219 may be disposed at a opposite ends of the first and second bodies 210, 211, adjacent the ramped projections 218. The ramped projections 218, 219 are configured such that when the cable 290 is placed between the inner walls 226, 227 of the first and second bodies 210, 211 and moved toward the second edges 222, 233 by the ramped surfaces 216', 217' as the first and second bodies are moved from the open configuration to the closed position, the ramped projections 218, 219 extend about the cable 290 and prevent the cable 290 from moving past the second edges 222, 223, except for the opening 229 in the second edges 222, 223 that is sized to permit a portion of the cable 290 to extend through the opening 229.

As shown in FIGS. 7 and 8, the ramped projections 218, 219 include ramped surfaces 218', 219', respectively. The ramped projections 218 each include a ramped surface 218' configured to engage a respective complementary ramped surface 211' on the second body 211, and the ramped projections 219 each include a ramped surface 219' configured to engage a respective complementary ramped surface 210' on the first body 210. The ramped projections 218, 219 extend over the cable 290 in the closed configuration of the first and second bodies 210, 211 to maintain the cable 290 in the groove 225 and prevent the cable 290 from moving past the second edges 222, 223, except for the opening 229 in the second edges 222, 223 that is sized to permit a portion of the cable 290 to extend through the opening 229.

Each of the bodies 210, 211 includes an outer wall 230, 231 on an opposite side relative to the respective inner walls 226, 227. Each of the outer walls 230, 231 includes a linear groove 232, 233 extending from the first end 226 to the second end 228 in the longitudinal direction. The linear grooves 232, 233 define tracks configured to slidingly receive the blade carriage 240. For example, the blade carriage 240 may include a blade carrying portion 244 and extension arms 242, 243. The extension arms 242, 243 extend parallel to one another from the blade carrying portion 244. The extension arms 242, 243 are spaced apart from one another such that the extension arms 242, 243 are configured to straddle the first and second bodies 210, 211 and face respective ones of the outer walls 230, 231 when the first and second bodies 210, 211 are in the closed configuration.

The extension arms 242, 243 may include guide portions 246, 247 extending toward one another from the respective extension arms 242, 243. The guide portions 246, 247 are sized and configured to be received by the linear grooves 232, 233. In some embodiments, the guide portions 246, 247 may include bearings 248, or other types of rotary members, configured to rotate relative to the extension arms 242, 243 as the carriage 240 is slidingly moved along the tracks defined by the linear grooves 232, 233 in a direction from the first end 226 toward the second end 228.

In use, a technician moves the first and second bodies 210, 211 to the open configuration and places the cable between the first and second bodies 210, 211 in the longitudinal direction. The first and second bodies 210, 211 are pivoted about the at least one hinge 213 from the open configuration to the closed configuration. As the first and second bodies 210, 211 are moved toward the closed configuration, the ramped projections 216, 217 move the cable 290 toward the groove 225, and the ramped projections 218, 219 extend about the cable 290 and prevent the cable 290 from moving past the second edges 222, 223, except for the opening 229 in the second edges 222, 223 that is sized to permit a portion of the cable 290 to extend through the opening 229.

The blade carriage 240 is then positioned relative to the closed configuration of the first and second bodies 210, 211 such that the extension arms 242, 243 straddle the first and second bodies 210, 211 and the guide portions 246, 247 are disposed in the linear grooves 232, 233. When the extension arms 242, 243 are positioned in the linear grooves 232, 233, the blade 250 is held at an acute angle relative to a plane that extends in the longitudinal direction parallel to the second edges 222, 223 of the bodies 210, 211. The blade carriage 240 is slidingly moved from the first end 224 to the second end 228 guided by the guide portions 246, 247 in the linear grooves 232, 233, and the acute angle of the blade 250 relative to the curvature of the cable 290 created by the groove 225 facilitates cutting of a portion of a jacket 292 of the cable 290 to form a window 294 into the cable 290 without damaging individual fibers (not shown) in the cable 290 so that the individual fibers in the cable 290 can be accessed. As the blade carriage 240 is slidingly moved along the tracks defined by the linear grooves 232, 233 in a direction from the first end 226 toward the second end 228, the blade 250 is configured to cut the portion of the jacket 292 of the cable 290 to form the window 294.

It should be appreciated that the first and second bodies 210, 211 and the blade carriage 240 are configured to reliably cut a consistently sized window through the jacket 292 of the cable 290. It should be appreciated that the first and second bodies 210, 211 could include a gripping feature in one or both of the groove portions 225a, 225b to prevent the cable 290 from sliding relative to the first and second bodies 210, 211. It should be appreciated that the blade carriage 240 can be used with first and second bodies 210, 211 that have various sized groove portions and various sizes in the closed configuration in order to accommodate different sized cables.

Figure 12:
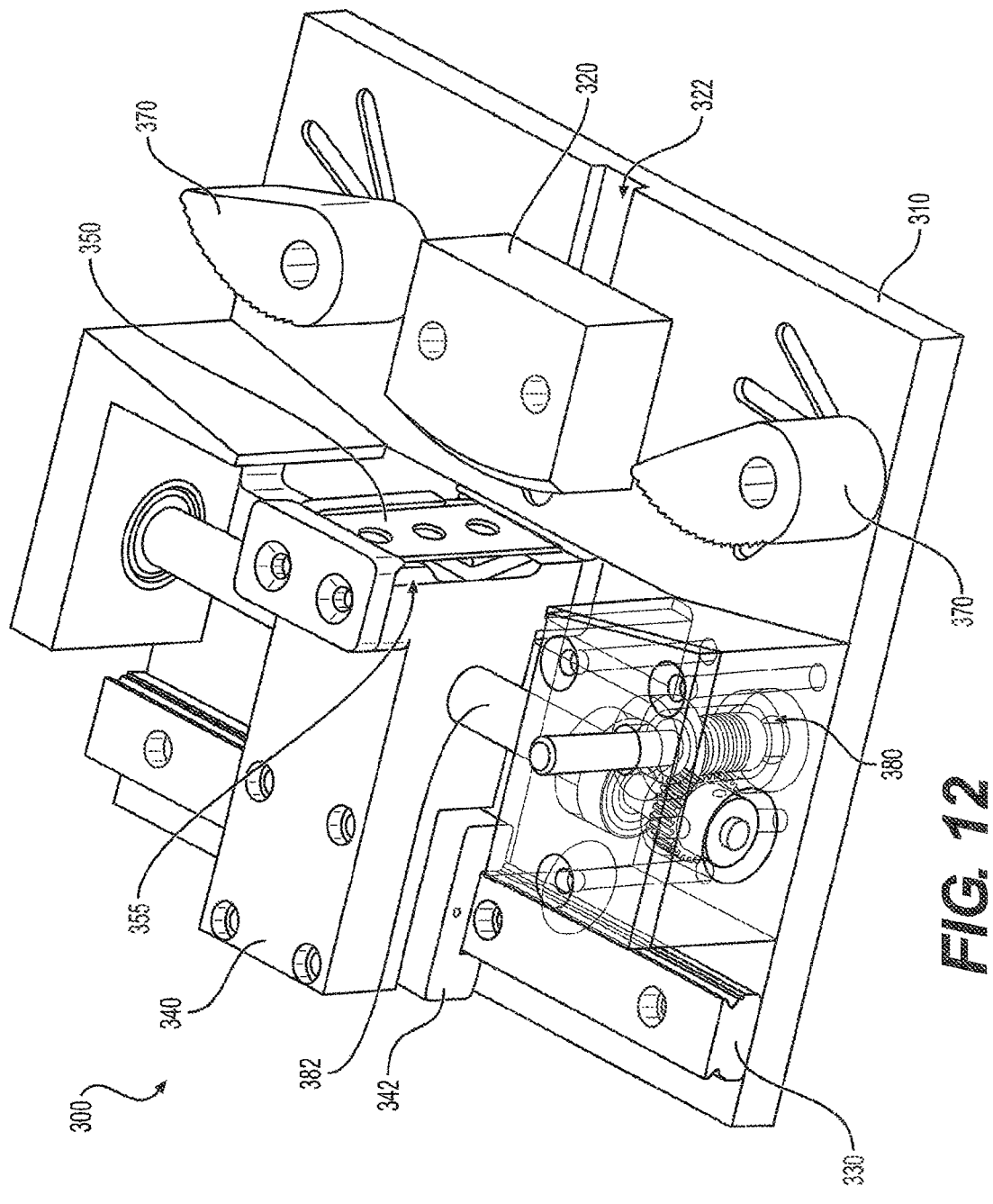
FIG. 12 is a perspective view of another embodiment an exemplary window cutting tool in accordance with various aspects of the disclosure.

FIG. 12 illustrates another exemplary embodiment of a window cutting tool 300 in accordance with the disclosure. The window cutting tool 300 includes a body 310, an adjustable shoe 320, a rail 330, a blade carriage 340, and a blade 350. The rail 330 is configured to be attached to the body 310, and the blade carriage 340 includes a slider 342 coupled with the rail 330 for sliding linear travel along the rail 330. The blade 350 is attached to the blade carriage 340 in a manner that creates a channel 355 for receiving shaving from the blade's cut.

The cutting tool 300 may also include a gearbox 380 configured to be coupled with a rotary tool, such as a drill. The gearbox 380 may include a worm gear to reduce rotational speed from the drill while increasing torque transferred to an output screw 382, as would be understood by persons skilled in the art. The carriage 340 can house a nut (not shown) mechanically coupled with the output screw 382 such that the nut and carriage 340 move along the output screw 382 when the output screw 382 is rotated. It should be appreciated that in some embodiments, the gearbox 380 can be eliminated, and the blade carriage 340 can be manually moved for sliding linear travel along the rail 330.

The adjustable shoe 320 is slidable in a slot 322 in the body 310 to adjust the position of the shoe 320 relative to the blade. The tool 300 may include spring biased clamping members 370 or cam cleats that secure a cable during a cutting procedure. The adjustable shoe 320 and clamping members 370 permit use of the cutting tool with various sized cables.

The blade 350 is held at an angle relative to the curvature of a cable created by a curved surface of the adjustable shoe to facilitate cutting of a portion of a jacket of the cable to form a window into the cable so that individual fibers in the cable can be accessed.

Figure 13:
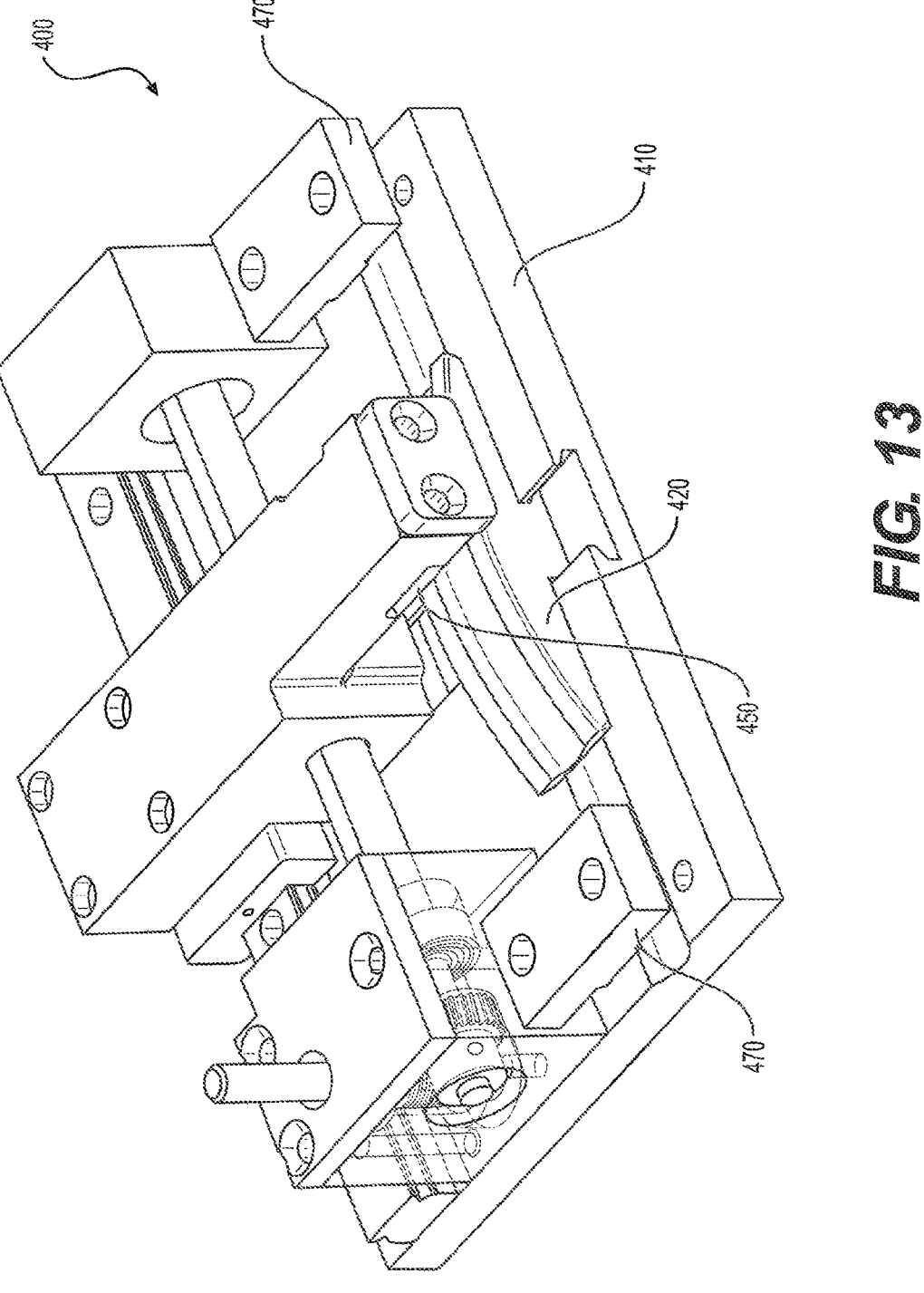
FIG. 13 is a perspective view of another embodiment an exemplary window cutting tool in accordance with various aspects of the disclosure.

FIG. 13 illustrates another exemplary embodiment of a window cutting tool 400 similar to the window cutting tool 300 described above. However, in the cutting tool 400, the curved surface of a base or shoe 420 is rotated by 90° relative to a body 410, and the blade 450 is similarly rotated by 90°. The base 420 can be removed and replaced with a different sized base in order to accommodate and cut cables of different sizes. The tool 400 includes clamping members 470 that can be coupled to the body 410 to secure a cable during a cutting procedure.

Although the present embodiments have been described with reference to specific example embodiments, it will be evident that various modifications may be made to these embodiments without departing from the broader spirit and scope of the various embodiments. Accordingly, the specification and the drawings are regarded in an illustrative rather than a restrictive sense.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A window cutting tool configured to cut a window through a jacket of a multi-fiber cable so that individual fibers within the cable can be accessed via the window, comprising:

a first body configured to extend in a longitudinal direction;

a second body configured to extend in the longitudinal direction and be coupled with the first body;

a blade carriage configured to be slidingly coupled with the first body and the second body;

wherein the first body and the second body are configured to pivot relative to one another about a hinge between an open configuration and a closed configuration;

wherein an inner wall of the first body and an inner wall of the second body are configured to move toward and away from one another as the first body and the second body are pivotally moved relative to one another between the open configuration and the closed configuration;

wherein the inner wall of the first body defines a first portion of a curved groove that extends from a first end of the first body to a second end of the first body in the longitudinal direction, and the inner wall of the second body defines a second portion of the curved groove;

wherein an outer wall of the first body and an outer wall of the second body each include a linear groove configured to guide sliding movement of the blade carriage relative to the first body and the second body in the longitudinal direction;

wherein the inner wall of the first body and the inner wall of the second body each include alignment structures configured to move a multi-fiber cable that extends in a longitudinal direction between the inner wall of the first body and the inner wall of the second body into the curved groove when the first body and the second body are pivotally moved relative to one another from the open configuration to the closed configuration;

wherein the curved groove is configured to expose a curved portion of the multi-fiber cable to an exterior of the first body and the second body when the first body and the second body are in the closed configuration;

wherein the blade carriage is configured to carry a blade at an acute angle relative to the exposed curved portion of the multi-fiber cable such that the blade is configured to cut a window through a jacket of the exposed curved portion of the multi-fiber cable as the blade carriage is slidingly moved relative to the first body and the second body in the longitudinal direction; and wherein the window cutting tool is configured to cut through the jacket of the multi-fiber cable at a desired depth to form a desired sized window without damaging individual fibers within the multi-fiber cable and that allows access to the individual fibers within the multi-fiber cable.

2. The window cutting tool of claim 1, wherein the alignment structures include projections extending from the inner wall of the first body and the inner wall of the second body.

3. The window cutting tool of claim 1, wherein the blade carriage includes a blade carrying portion configured to carry the blade and extension arms configured to extend from the blade carrying portion;

wherein the extension arms are configured to straddle the first body and the second body in the closed configuration.

4. The window cutting tool of claim 3, wherein the extension arms include guide portions configured to be received in the linear grooves and to guide sliding movement of the blade carriage relative to the first body and the second body in the longitudinal direction.

5. A window cutting tool configured to cut a window through a jacket of a multi-fiber cable, comprising:

a first body;

a second body configured to be pivotally coupled with the first body between an open configuration and a closed configuration;

a blade carriage configured to be slidingly coupled with the first body and the second body;

wherein an inner wall of the first body and an inner wall of the second body are configured to move toward and away from one another as the first body and the second body are pivotally moved relative to one another between the open configuration and the closed configuration;

wherein the inner wall of the first body and the inner wall of the second body cooperate to define a curved groove extending from a first end of the first body to a second end of the first body in a longitudinal direction;

wherein at least one of an outer wall of the first body and an outer wall of the second body includes a guide feature configured to guide sliding movement of the blade carriage relative to the first body and the second body in the longitudinal direction;

wherein at least one of the inner wall of the first body and the inner wall of the second body includes an alignment feature configured to move a multi-fiber cable that extends in a longitudinal direction between the inner wall of the first body and the inner wall of the second body into the curved groove when the first body and the second body are pivotally moved relative to one another from the open configuration to the closed configuration;

wherein the curved groove is configured to expose a curved portion of the multi-fiber cable to an exterior of the first body and the second body when the first body and the second body are in the closed configuration;

wherein the blade carriage is configured to carry a blade at an acute angle relative to the exposed curved portion of the multi-fiber cable such that the blade is configured to cut a window through a jacket of the exposed curved portion of the multi-fiber cable as the blade carriage is slidingly moved relative to the first body and the second body in the longitudinal direction; and wherein the window cutting tool is configured to consistently and reliably cut through the jacket of the multi-fiber cable at a desired depth to form a desired sized window without damaging an individual fiber within the multi-fiber cable and that allows access to the individual fiber within the multi-fiber cable.

6. The window cutting tool of claim 5, wherein the alignment feature includes a projection extending from the at least one of the inner wall of the first body and the inner wall of the second body.

7. The window cutting tool of claim 5, wherein the blade carriage includes a blade carrying portion configured to carry the blade and extension arms configured to extend from the blade carrying portion;

wherein the extension arms are configured to straddle the first body and the second body in the closed configuration.

8. The window cutting tool of claim 7, wherein at least one of the extension arms includes a guide portion configured to be received in the guide feature and to guide sliding movement of the blade carriage relative to the first body and the second body in the longitudinal direction.

9. The window cutting tool of claim 5, wherein the first body and the second body are configured to pivot relative to one another about a hinge between the open configuration and the closed configuration.

10. The window cutting tool of claim 5, wherein the inner wall of the first body defines a first portion of the curved groove and the inner wall of the second body defines a second portion of the curved groove.

11. The window cutting tool of claim 5, wherein the outer wall of the first body and the outer wall of the second body each include the guide feature configured to guide sliding movement of the blade carriage relative to the first body and the second body in the longitudinal direction.

12. The window cutting tool of claim 5, wherein the inner wall of the first body and the inner wall of the second body include the alignment structure configured to move the multi-fiber cable into the curved groove when the first body and the second body are pivotally moved relative to one another from the open configuration to the closed configuration.

13. A window cutting tool comprising:
a first body;
a second body configured to be pivotally coupled with the first body between an open configuration and a closed configuration;
a blade carriage configured to carry a blade and to be slidingly coupled with at least one of the first body and the second body;
wherein at least one of the first body and the second body is configured to guide sliding movement of the blade carriage relative to the first body and the second body in a longitudinal direction;
wherein the first body and the second body are configured to expose a portion of a multi-fiber cable to the blade carriage when the first body and the second body are in the closed configuration;
wherein the blade carriage includes a blade carrying portion configured to carry the blade and extension arms configured to extend from the blade carrying portion; and
wherein the extension arms are configured to straddle the first body and the second body in the closed configuration; and
wherein the blade is configured to cut through a jacket of the multi-fiber cable in the longitudinal direction as the blade carriage slides relative to the first body and the second body without damaging an individual fiber within the multi-fiber cable so as to form a window that is configured to allow access to the individual fiber within the multi-fiber cable.

14. The window cutting tool of claim 13,
wherein the first body and the second body are configured to define a curved groove configured to extend from a first end of the first body to a second end of the first body in a longitudinal direction and to expose a curved portion of a multi-fiber cable;
wherein at least one of the first body and the second body includes an alignment feature configured to move the multi-fiber cable into the curved groove when the first body and the second body are pivotally moved relative to one another from the open configuration to the closed configuration; and
wherein the alignment feature includes a projection extending from the at least one of an inner wall of the first body and an inner wall of the second body.

15. The window cutting tool of claim 13, wherein at least one of the extension arms includes a guide portion configured to be received in a guide feature of at least one of the first body and the second body and to guide sliding movement of the blade carriage relative to the first body and the second body in the longitudinal direction.

16. The window cutting tool of claim 15, wherein an outer wall of the first body and an outer wall of the second body each include the guide feature configured to guide sliding movement of the blade carriage relative to the first body and the second body in the longitudinal direction.

17. The window cutting tool of claim 13, wherein the first body and the second body are configured to pivot relative to one another about a hinge between the open configuration and the closed configuration.

18. A window cutting tool comprising:
a first body;
a second body configured to be pivotally coupled with the first body between an open configuration and a closed configuration;
a blade carriage configured to carry a blade and to be slidingly coupled with at least one of the first body and the second body;
wherein at least one of the first body and the second body is configured to guide sliding movement of the blade carriage relative to the first body and the second body in a longitudinal direction;
wherein the first body and the second body are configured to expose a portion of a multi-fiber cable to the blade carriage when the first body and the second body are in the closed configuration;
wherein the first body and the second body are configured to define a curved groove configured to extend from a first end of the first body to a second end of the first body in a longitudinal direction and to expose a curved portion of a multi-fiber cable;
wherein at least one of the first body and the second body includes an alignment feature configured to move the multi-fiber cable into the curved groove when the first body and the second body are pivotally moved relative to one another from the open configuration to the closed configuration;
wherein the alignment feature includes a projection extending from the at least one of an inner wall of the first body and an inner wall of the second body; and
wherein the blade is configured to cut through a jacket of the multi-fiber cable in the longitudinal direction as the blade carriage slides relative to the first body and the second body without damaging an individual fiber within the multi-fiber cable so as to form a window that is configured to allow access to the individual fiber within the multi-fiber cable.

19. The window cutting tool of claim 18, wherein an inner wall of the first body defines a first portion of the curved groove and an inner wall of the second body defines a second portion of the curved groove.

20. The window cutting tool of claim 18, wherein an inner wall of the first body and an inner wall of the second body each include the alignment feature configured to move the multi-fiber cable into the curved groove when the first body and the second body are pivotally moved relative to one another from the open configuration to the closed configuration.

* * * * *